United States Patent
McIntosh (10) Patent No.: US 11,756,171 B1
(45) Date of Patent: Sep. 12, 2023

(54) SYSTEMS AND METHODS FOR INCREASING IMAGE FIDELITY

(71) Applicant: GoPro, Inc., San Mateo, CA (US)

(72) Inventor: Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 142 days.

(21) Appl. No.: 17/369,766

(22) Filed: Jul. 7, 2021

(51) Int. Cl.
*G06T 5/00* (2006.01)
*G06T 3/00* (2006.01)
*G06T 3/40* (2006.01)

(52) U.S. Cl.
CPC ............ *G06T 5/006* (2013.01); *G06T 3/0018* (2013.01); *G06T 3/0093* (2013.01); *G06T 3/4053* (2013.01); *G06T 5/003* (2013.01); *G06T 2207/20132* (2013.01)

(58) Field of Classification Search
CPC ............... G06T 3/0018; G06T 3/0093; G06T 5/00–006; G06T 3/40; G06T 3/4007; G06T 3/4046; G06T 3/4053–4076; G06T 2207/20132
See application file for complete search history.

(56) References Cited

U.S. PATENT DOCUMENTS

| | | | | |
|---|---|---|---|---|
| 2009/0059041 A1* | 3/2009 | Kwon | ................... | H04N 23/81 348/241 |
| 2015/0363921 A1* | 12/2015 | Baek | ...................... | H04N 25/61 348/241 |
| 2017/0358061 A1* | 12/2017 | Choi | ...................... | G06T 3/0062 |
| 2022/0207747 A1* | 6/2022 | Su | ............................. | G06T 7/12 |

OTHER PUBLICATIONS

Helland, Tanner. "A simple algorithm for correcting lens distortion," Feb. 11, 2013. <https://tannerhelland.com/2013/02/11/simple-algorithm-correcting-lens-distortion.html>. (Year: 2013).*

* cited by examiner

Primary Examiner — John B Strege
(74) Attorney, Agent, or Firm — ESPLIN & ASSOCIATES, PC (57) ABSTRACT

Image captured through a non-rectilinear lens may exhibit distortions. The distortions may be reduced by warping the image. However, warping the image may degrade the fidelity of the image. The warped image may be enhanced to increase the fidelity of the image. The enhancement may be applied to the portions of the image that were degraded from the warping.

20 Claims, 6 Drawing Sheets

METHOD 200

201 Obtain visual information, the visual information defining visual content of an image, the visual content depicting a scene with a distortion based on capture of the visual content through a non-rectilinear lens such that a straight line within the scene is depicted as a curved line within the visual content.

202 Generate rectilinear visual content based on non-uniform warping of the visual content, the non-uniform warping of the visual content including straightening of the curved line within the visual content, the non-uniform warping of the visual content including different warping applied to different portions of the visual content such that the rectilinear visual content has non-uniform fidelity.

203 Generate higher-fidelity visual content based on non-uniform enhancement of the rectilinear visual content, the non-uniform enhancement of the rectilinear visual content performed based on the non-uniform warping of the visual content, wherein the non-uniform enhancement of the rectilinear visual content increases fidelity uniformity of the higher-fidelity visual content.

SYSTEMS AND METHODS FOR INCREASING IMAGE FIDELITY

FIELD

This disclosure relates to increasing image fidelity using non-uniform enhancement of warped image.

BACKGROUND

An image captured through a non-rectilinear may be distorted. Reducing distortion in the image through warping may reduce the fidelity of the image.

SUMMARY

This disclosure relates to increasing image fidelity. Visual information and/or other information may be obtained. The visual information may define visual content of an image. The visual content may depict a scene with a distortion based on capture of the visual content through a non-rectilinear lens such that a straight line within the scene is depicted as a curved line within the visual content. Rectilinear visual content may be generated based on non-uniform warping of the visual content. The non-uniform warping of the visual content may include straightening of the curved line within the visual content. The non-uniform warping of the visual content may include different warping applied to different portions of the visual content such that the rectilinear visual content has non-uniform fidelity. A first portion of the rectilinear visual content may have first fidelity and a second portion of the rectilinear visual content may have second fidelity lower than the first fidelity.

Higher-fidelity visual content may be generated based on non-uniform enhancement of the rectilinear visual content. The non-uniform enhancement of the rectilinear visual content may be performed based on the non-uniform warping of the visual content and/or other information. The non-uniform enhancement of the rectilinear visual content may increase fidelity uniformity of the higher-fidelity visual content. The fidelity uniformity of the higher-fidelity visual content may be increased such that difference between the first fidelity of the first portion of the higher-fidelity visual content and the second fidelity of the second portion of the higher-fidelity visual content is reduced.

A system that increases image fidelity may include one or more electronic storages, one or more processors, and/or other components. An electronic storage may store visual information, information relating to visual content, information relating to rectilinear visual content, information relating to higher-fidelity visual content, information relating to distortion, information relating to a non-rectilinear lens, information relating to capture of visual content, information relating to non-uniform warping, information relating to non-uniform enhancement, and/or other information. In some implementations, the system may include one or more optical elements, one or more image sensors, and/or other components.

One or more components of the system may be carried by a housing, such as a housing of an image capture device. For example, the optical element(s) and/or the image sensor(s) of the system may be carried by the housing of an image capture device. The housing may carry other components, such as the processor(s) and/or the electronic storage. In some implementations, the higher-fidelity visual content may be generated before encoding of the image by the image capture device.

The processor(s) may be configured by machine-readable instructions. Executing the machine-readable instructions may cause the processor(s) to facilitate increasing image fidelity. The machine-readable instructions may include one or more computer program components. The computer program components may include one or more of a visual information component, a non-uniform warming component, a non-uniform enhancement component, and/or other computer program components.

The visual information component may be configured to obtain visual information and/or other information. The visual information may define visual content of an image. The visual content may depict a scene. The scene may be depicted with a distortion based on capture of the visual content through a non-rectilinear lens. Capture of the visual content through the non-rectilinear lens may cause a straight line within the scene to be depicted as a curved line within the visual content.

In some implementations, the distortion may include a barrel distortion and the non-rectilinear lens may include a fisheye lens.

The non-uniform warming component may be configured to generate rectilinear visual content. The rectilinear visual content may be generated based on non-uniform warping of the visual content. The non-uniform warping of the visual content may include straightening of the curved line within the visual content. The non-uniform warping of the visual content may include different warping applied to different portions of the visual content. Application of different warping to different portions of the visual content may result in the rectilinear visual content having non-uniform fidelity. A first portion of the rectilinear visual content may have first fidelity and a second portion of the rectilinear visual content may have second fidelity lower than the first fidelity.

In some implementations, generation of the rectilinear visual content may include cropping of one or more outer portions of the visual content.

In some implementations, the non-uniform warping of the visual content including the different warping applied to the different portions of the visual content may include different strengths of warping being applied to the different portions of the visual content.

In some implementations, the non-uniform warping of the visual content including the different warping applied to the different portions of the visual content may further include different directions of warping being applied to the different portions of the visual content.

The non-uniform enhancement component may be configured to generate higher-fidelity visual content. The higher-fidelity visual content may be generated based on non-uniform enhancement of the rectilinear visual content. The non-uniform enhancement of the rectilinear visual content may be performed based on the non-uniform warping of the visual content and/or other information. The non-uniform enhancement of the rectilinear visual content may increase fidelity uniformity of the higher-fidelity visual content. The fidelity uniformity of the higher-fidelity visual content may be increased such that difference between the first fidelity of the first portion of the higher-fidelity visual content and the second fidelity of the second portion of the higher-fidelity visual content is reduced.

In some implementations, the non-uniform enhancement of the rectilinear visual content may include application of non-uniform super-resolution to the rectilinear visual content. In some implementations, the non-uniform enhancement of the rectilinear visual content may include application of non-uniform sharpening to the rectilinear visual content.

In some implementations, the non-uniform enhancement of the rectilinear visual content being performed based on the non-uniform warping of the visual content may include different strengths of enhancement being applied to the different portions of the rectilinear visual content based on the different strengths of warping applied to the different portions of the visual content and/or other information.

In some implementations, the non-uniform enhancement of the rectilinear visual content being performed based on the non-uniform warping of the visual content may further include different types of enhancement being applied to the different portions of the rectilinear visual content based on the different directions of warping applied to the different portions of the visual content and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
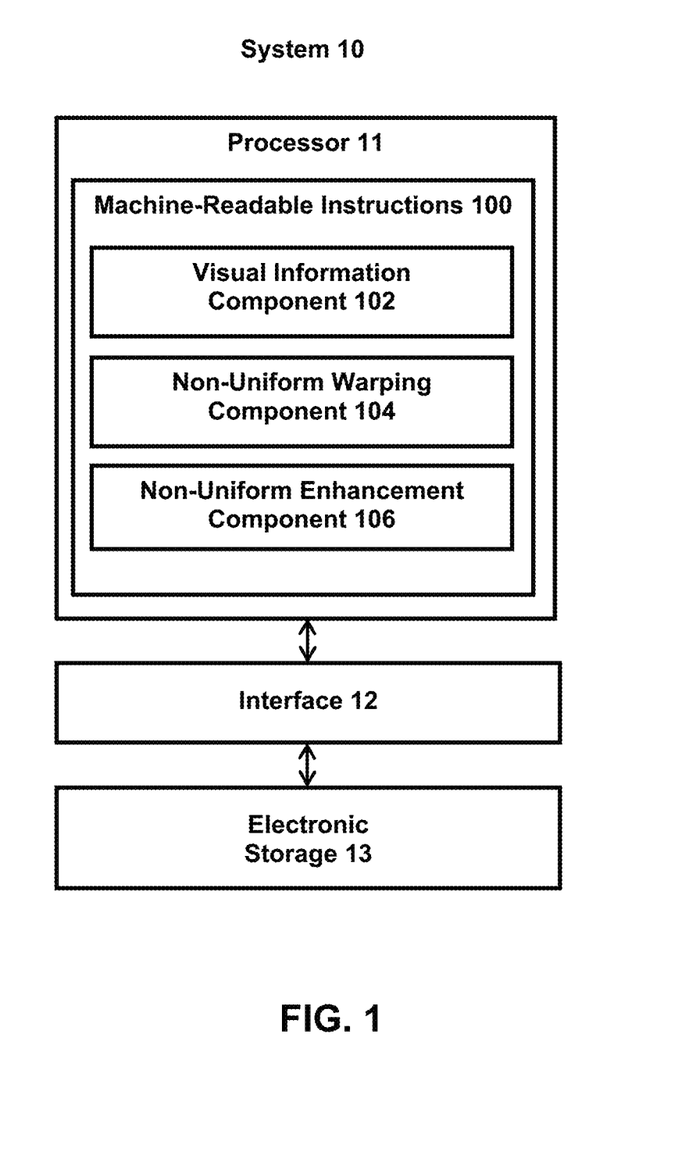
FIG. 1 illustrates an example system for increasing image fidelity.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more optical elements, one or more image sensors, and/or other components. Visual information and/or other information may be obtained by the processor 11. The visual information may define visual content of an image. The visual content may depict a scene with a distortion based on capture of the visual content through a non-rectilinear lens such that a straight line within the scene is depicted as a curved line within the visual content. Rectilinear visual content may be generated by the processor 11 based on non-uniform warping of the visual content. The non-uniform warping of the visual content may include straightening of the curved line within the visual content. The non-uniform warping of the visual content may include different warping applied to different portions of the visual content such that the rectilinear visual content has non-uniform fidelity. A first portion of the rectilinear visual content may have first fidelity and a second portion of the rectilinear visual content may have second fidelity lower than the first fidelity.

Higher-fidelity visual content may be generated by the processor 11 based on non-uniform enhancement of the rectilinear visual content. The non-uniform enhancement of the rectilinear visual content may be performed based on the non-uniform warping of the visual content and/or other information. The non-uniform enhancement of the rectilinear visual content may increase fidelity uniformity of the higher-fidelity visual content. The fidelity uniformity of the higher-fidelity visual content may be increased such that difference between the first fidelity of the first portion of the higher-fidelity visual content and the second fidelity of the second portion of the higher-fidelity visual content is reduced.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to rectilinear visual content, information relating to higher-fidelity visual content, information relating to distortion, information relating to a non-rectilinear lens, information relating to capture of visual content, information relating to non-uniform warping, information relating to non-uniform enhancement, and/or other information.

Visual content may refer to content of image(s) (e.g., single image, burst images, video frame(s), and/or video(s)) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length (duration, number of frames) of the video. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device. A field of view of visual content may define a field of view of a scene captured within the visual content. A field of view of visual content may refer to an extent of a scene captured and/or viewable within the visual content. A field of view of visual content may refer to a part of a scene from which light is received for generation of the visual content. For example, an image may include a wide field of view image, such as a panoramic image or a spherical image, and the field of view may of the image may include a wide field of view (e.g., greater than 120 degrees, 360 degrees). Other fields of view are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s) and/or image sensor(s) of the system 10 may be carried by the housing of the image capture device. The housing may carry other components, such as the processor 11 and/or the electronic storage 13. References to a housing of an image capture device may refer to the image capture device, and vice versa.

Figure 3:
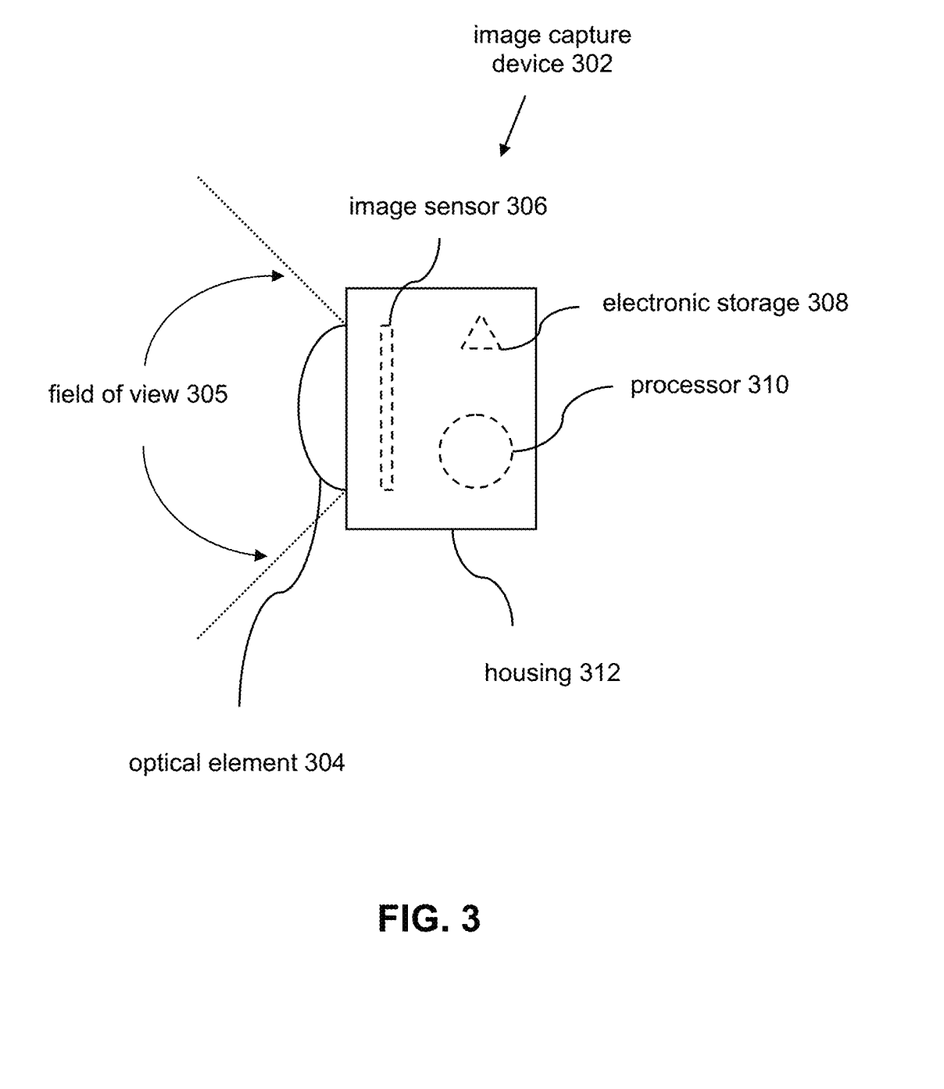
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, an electronic storage 308, a processor 310, and/or other components.

One or more components of the image capture device 302 may be the same as, be similar to, and/or correspond to one or more components of the system 10. For example, the electronic storage 308 may be the same as, be similar to, and/or correspond to the electronic storage 13. The processor 310 may be the same as, be similar to, and/or correspond to the processor 11. The image capture device 302 may include other components not shown in FIG. 3, such as one or more sound sensors. The sound sensor(s) may be used by the image capture device 302 to capture audio content. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

For example, the optical element 304 may include a non-rectilinear lens. A non-rectilinear lens may include a curvilinear lens. A non-rectilinear lens may refer to a lens that produces images where straight features in a scene appear as non-straight lines (e.g., curved lines). A non-rectilinear lens may cause visual content captured through the lens to include distortion within one or more portions of the visual content. For example, the optical element 304 may include a fisheye lens, which may cause the visual content captured through the optical element 304 to include barrel distortion and/or other distortion. Other types of optical element/lens and other types of distortion within the visual content are contemplated.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content. Video content may include other content captured by the image capture device 302, such as audio content captured by the image capture device.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306, and/or facilitate transfer of information from the image sensor 306 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may obtain visual information defining visual content captured through the optical element 304. The visual content may depict a scene observed within the field of view 305 by the image sensor 306. The visual content captured by the image sensor 306 may depict the scene with one or more distortions based on the capture of the visual content through the optical element 304, with the optical element 304 include one or more non-rectilinear lens. The distortion(s) may cause a straight line within the scene to be depicted as a curved line within the visual content.

The processor 310 may warp the visual content to generate rectilinear visual content. The visual content may be warped non-uniformly to straighten curved portions of the visual content. For portions with less curvature (due to the non-rectilinear lens), less warping may be applied. For portions with greater curvature, greater warping may be applied. For example, the visual content may have been captured through a fisheye lens, and the processor 310 may unwrap/stretch the visual content to make the visual content look as if it were captured through rectilinear lens. The rectilinear visual content may have non-uniform fidelity due to the non-uniform warping applied to the visual content. Portions of the visual content that was warped more (e.g., more stretching applied) may have lower fidelity than Portions of the visual content that was warped less/not warped (e.g., less stretching applied, no stretching applied, squeezing applied). For example, fisheye visual content may be warped more in the corners than in the center to generate the rectilinear visual content, and the corners of the rectilinear visual content may have less fidelity than the center of the rectilinear visual content.

The processor 310 may increase the uniformity of the fidelity throughout the rectilinear visual content to generate higher-fidelity visual content. The processor 310 may increase the fidelity throughout the rectilinear visual content by non-uniformly enhancing the rectilinear visual content. The processor 310 may apply different amount and/or type of enhancement to different portions of the rectilinear visual content based on the non-uniform warping of the visual content to generate those portions. That is, the amount and/or the type of enhancement applied to a portion of the rectilinear visual content may depend on how the visual content was warp to generate that portion.

For example, the loss/reduction in fidelity of a portion of the rectilinear visual content may depend on the strength and/or the direction in which the visual content was warped to generate the portion. The processor 310 may adjust the strength and/or type of enhancement applied to the portion based on the strength and/or the direction in which the visual content was warped to generate the portion. The processor 310 may pick the strength and/or type of enhancement applied to the portion to restore (completely restore, partially restore) the fidelity reduction caused by the warping. For instance, the processor 310 may pick the strength and/or type of enhancement applied to the portion to repair the damage done to the portion of the image via the warping of the portion. The higher-fidelity visual content may be generated by the processor 310 before and/or after encoding of the image by the image capture device. For example, the processor 310 may generate the higher-fidelity visual content to replace the visual content when encoding the image. The processor 310 may generate the higher-fidelity visual content to encode an additional image with higher fidelity (e.g., encode the original image and the higher-fidelity image).

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate increasing image fidelity. The machine-readable instructions 100 may include one or more computer program components. The machine-readable instructions 100 may include one or more of a visual information component 102, a non-uniform warming component 104, a non-uniform enhancement component 106, and/or other computer program components.

The visual information component 102 may be configured to obtain visual information and/or other information. Obtaining visual information may include one or more of accessing, acquiring, analyzing, determining, examining, generating, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

In some implementations, the visual information component 102 may obtain visual information based on user interaction with a user interface/application (e.g., image/video editing application, image/video viewer application), and/or other information. For example, a user interface/application may provide option(s) for a user to select visual content in which fidelity is to be increased. The visual information defining the visual content may be obtained based on the user's selection of the visual content/image through the user interface/video application. Other selections of visual content/image for retrieval of visual information are contemplated.

The visual information may define visual content of an image. The visual content of the image may depict a scene. The visual content may depict a scene that is captured through an optical element (e.g., lens) of an image capture device. A scene may refer to a place and/or a location in which an image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

The scene may be depicted with one or more distortions based on capture of the visual content through a non-rectilinear lens. The capture of the visual content through a non-rectilinear lens (e.g., fisheye lens) may cause one or more portions of the visual content to depict with scene with one or more distortions. For example, capture of the visual content through a non-rectilinear lens may cause a straight line within the scene to be depicted as a curved line within the visual content.

A distortion may refer to deviation from rectilinear projection. In rectilinear projection, a straight line within a scene depicted within the visual content may appear as a straight line. A distortion may cause deviation of the visual content from rectilinear projection such that a straight line within a scene depicted within the visual content appears as a curved line. For example, the distortion may include a radial distortion, a barrel distortion, a pincushion distortion, and/or other distortions. For instance, the distortion may include a barrel distortion based on capture of the visual content through a fisheye lens.

Figure 4:
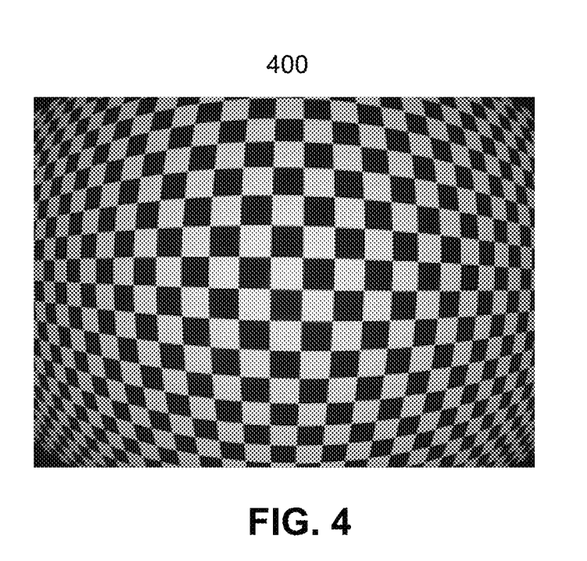
FIG. 4 illustrates an example image with barrel distortion.

FIG. 4 illustrates an example 400 image with barrel distortion. The barrel distortion may cause image magnification to decrease with distance from the optical axis, simulating an image mapped around a sphere/barrel. The barrel distortion may create curves within the image 400. The curvature effect of the barrel distortion may increase with greater distance from the center of the image 400. For example, the center option of the image 400 may exhibit little/no curvature due to barrel distortion, while the corners of the image 400 may exhibit most curvature due to barrel distortion.

The distortion within the visual content may cause different portions of the visual content to be stored using different number of pixels. For example, referring to FIG. 4, the center portion of the image 400 may be stored using a greater number of pixels than the corner portions of the image 400. For instance, the center square of the image 400 may be captured using greater surface area/grater number of pixels of the image sensor than a corner square of the image 400, resulting in the center being depicted with higher fidelity than the corner square.

The non-uniform warming component 104 may be configured to generate rectilinear visual content. The rectilinear visual content may be generated for viewing and/or storage. The rectilinear visual content may be generated by changing the visual content. The rectilinear visual content may be generated to replace the visual content and/or as a different version of the visual content.

The rectilinear visual content may be generated based on non-uniform warping of the visual content. Warping of the visual content may refer to digital manipulation of the visual content. Warping of the visual content may refer to distortion of thing(s) depicted within the visual content. Warping of the visual content may refer to change in how the visual content depicts thing(s). For example, warping of the visual content may include stretching and/or squeezing of the visual content in one or more directions. Other types of warping of the visual content are contemplated.

In some implementations, the non-uniform warping of the visual content may be performed based on the distortion within the visual content. The non-uniform warping of the visual content may be performed to eliminate/reduce the distortion within the visual content. In some implementations, the non-uniform warping of the visual content may be performed based on analysis of the visual content. For example, the visual content may be analyzed to identify/characterize the distortion within the visual content, and the non-uniform warping of the visual content may be performed based identified/characterized distortion.

In some implementations, the non-uniform warping of the visual content may be performed based one or more optical elements through which the visual content was captured. For example, the non-uniform warping of the visual content may be performed based the type/characteristics of non-rectilinear lens through which the visual content was captured. In some implementations, the information about the optical element(s) through which the visual content was captured may be obtained. For example, visual information defining the visual content may include information about the optical element(s) through which the visual content was captured. Information about the optical element(s) through which the visual content was captured may be obtained as metadata of the image.

Non-uniform warping of the visual content may refer to varied warping of the visual content. Non-uniform warping of the visual content may refer to warping of the visual content in which different types and/or different amount of warping are performed at different portions of the visual content. For example, non-uniform warping of the visual content may include different warping applied to different portions of the visual content. For instance, include different strengths of warping may be applied to different portions of the visual content. For example, the amount by which a portion of the visual content is stretched and/or squeezed may change over the visual content. Different directions of warping may be applied to different portions of the visual content. For example, a portion of the visual content may be stretched and/or squeezed in one direction while a different portion of the visual content may be stretched and/or squeezed in another direction.

The non-uniform warping of the visual content may include straightening of curved line(s) within the visual content. That is, the non-uniform of the visual content may straighten straight lines within the scene that are depicted as curved lines within the visual content (due to the distortion within the visual content). Straightening of a curved line may include complete straightening of the curved line so that a straight line within the scene is depicted as a straight line within the rectilinear visual content. Straightening of a curved line may include partial straightening of the curved line so that a straight line within the scene is depicted with less curvature within the rectilinear visual content than within the visual content.

Figure 5:
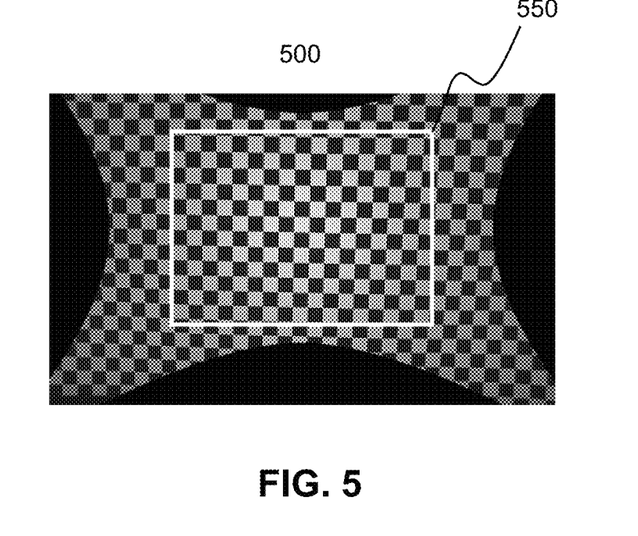
FIG. 5 illustrates an example warping of the image shown in FIG. 4.

FIG. 5 illustrates an example warping of the image shown in FIG. 4. In FIG. 5, the image 500 (rectilinear image) may be generated by non-uniformly warping the image 400 shown in FIG. 4. The depiction within the image 500 may have straighter lines than the depiction within the image 400. The non-uniform warping of the image 400 may produce the image 500 that depicts things uniformly. For example, rather than features within the center of the image 400 being magnified and the corners of the image 400 being greatly curved, the features within the image 500 may be depicted with same/similar magnification and the amount of curvature may be reduced.

In some implementations, generation of the rectilinear visual content may include cropping of one or more outer portions of the visual content. For example, to generate the rectilinear visual content, the portions of the visual content outside a punchout 550 may be removed. Such generation of the rectilinear visual content may allow the rectilinear visual content to fill a display without missing information.

Application of different warping to different portions of the visual content may result in the rectilinear visual content having non-uniform fidelity. The rectilinear visual content having non-uniform fidelity may refer to the fidelity of the rectilinear visual content varying over the visual rectilinear content. The rectilinear visual content having non-uniform fidelity may refer to the fidelity of a portion of the rectilinear visual content being different from the fidelity of a different portion of the rectilinear visual content. For example, referring to FIG. 5, the fidelity of the image 500 may be higher in the center of the image 500 than in the corner of the image 500. For example, the fidelity of the image 500 may decrease with greater distance from the center of the image 500.

Fidelity of visual content may refer to a degree of exactness with which the visual content depicts one or more things (e.g., scene within the field of view of the image capture device). Fidelity of visual content may refer to quality of depiction within the visual content (e.g., how closely the depiction of a thing represents the thing). For example, fidelity of visual content may include number of resolution/pixels used for depiction of thing(s) in the visual content, sharpness/blurriness of the visual content, color accuracy of the visual content, texture accuracy of the visual content, amount of details depicted (e.g., highlight detail, shadow detail) in the visual content, amount of noise in the visual content, and/or other fidelity of the visual content.

Figure 6A:
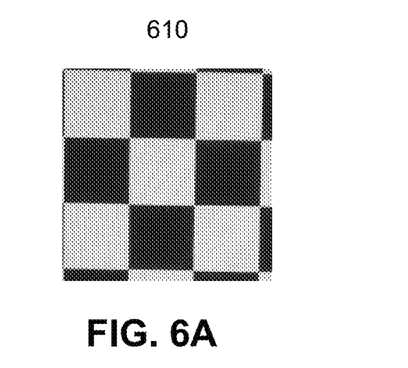
FIGS. 6A and 6B illustrate example portions of the warped image shown in FIG. 5.
Figure 6B:
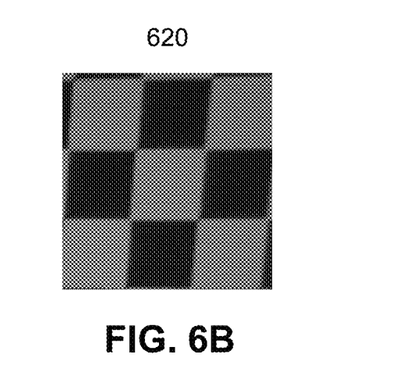

For example, FIGS. 6A and 6B illustrate example portions 610, 620 of the warped image shown in FIG. 5. The portion 610 may include a center portion of the image 500. The portion 620 may include an upper-right portion of the image 500. The non-uniform warping performed to generate the image 500 may result in the fidelity of the portion 510 being higher/better than the fidelity of the portion 620. For example, the center of the image 400 may have been squeezed to generate the portion 610, and the portion 610 may include clear depiction of things/good details of things. The upper-right portion of the image 400 may have been stretched to generate the portion 620, and the portion 620 may include blurry depiction of things/lack details of things.

The non-uniform enhancement component 106 may be configured to generate higher-fidelity visual content. The higher-fidelity visual content may be generated for viewing and/or storage. The higher-fidelity visual content may be generated by changing the rectilinear visual content. The higher-fidelity visual content may be generated to replace the rectilinear visual content, to replace the visual content, and/or as a different version of the visual content.

The higher-fidelity visual content may be generated based on non-uniform enhancement of the rectilinear visual content. Enhancement of the visual content may refer to modification of the visual content to improvement the fidelity of the visual content. Enhancement of the visual content may refer increase in accuracy of how the visual content depicts things. For example, enhancement of the visual content may increase the number of resolution/pixels used for depiction of thing(s) in the visual content, increase the sharpness of the visual content, increase the color accuracy of the visual content, increase the texture accuracy of the visual content, increase the amount of details depicted (e.g., highlight detail, shadow detail) in the visual content, reduce the amount of noise in the visual content, and/or other increase other fidelity of the visual content. Other types of enhancement of the visual content are contemplated.

In some implementations, the non-uniform enhancement of the rectilinear visual content may be performed based on the non-uniform warping of the visual content and/or other information. The non-uniform enhancement of the rectilinear visual content may be performed to restore/increase fidelity of the visual content lost during the non-uniform warping of the visual content. In some implementations, the non-uniform enhancement of the rectilinear visual content may be performed based analysis of the rectilinear visual content. For example, the rectilinear visual content may be analyzed to identify/characterize the fidelity within different portions of the rectilinear visual content, and the non-uniform enhancement of the rectilinear visual content may be performed based on the identified/characterized fidelity within different portions of the rectilinear visual content. As another example, the rectilinear visual content may be analyzed to identify/characterize the amount/type of warping performed to generate different portions of the rectilinear visual content, and the non-uniform enhancement of the rectilinear visual content may be performed based on the identified/characterized amount/type of warping performed for different portions of the rectilinear visual content.

In some implementations, the non-uniform enhancement of the rectilinear visual content may be performed based on one or more optical elements through which the visual content was captured. For example, the non-uniform enhancement of the rectilinear visual content may be performed based the type/characteristics of non-rectilinear lens through which the visual content was captured. For instance, the type/characteristics of non-rectilinear lens through which the visual content was captured may determine how both the non-uniform warping of the visual content and the non-uniform enhancement of the rectilinear visual content are performed.

Non-uniform enhancement of the rectilinear visual content may refer to varied enhancement of the rectilinear visual content. Non-uniform enhancement of the rectilinear visual content may refer to enhancement of the rectilinear visual content in which different types and/or different amount of enhancement area performed at different portions of the rectilinear visual content. For example, the strength (intensity) of enhancement applied may change over the rectilinear visual content. For instance, different strengths of enhancement may be applied to different portions of the rectilinear visual content based on different strengths of warping applied to the different portions of the visual content to generate those portions of the rectilinear visual content. As another example, the type of enhancement applied may change over the rectilinear visual content. For instance, different types of enhancement may be applied to different portions of the rectilinear visual content based on different directions of warping applied to different portions of the visual content to generate those portions of the rectilinear visual content.

For example, the extent of fidelity lost due to warping may be determined (e.g., mapped onto a heatmap), and the strength and the type of enhancement applied may be adjusted to restore (completely restore, partially restore) the lost fidelity. For instance, the value of the heatmap may be used as a multiplier for the strength of enhancement that is applied (e.g., using the value of the heatmap to apply gradient of enhancement).

As another example, the variation in fidelity over the rectilinear visual content may be determined (e.g., mapped onto a heatmap), and the strength and the type of enhancement applied may be adjusted to equalize fidelity over different portions of the higher-fidelity visual content. For instance, different strength and/or type of enhancement applied so that different portions of the higher-fidelity visual content have the same fidelity or approximately the same fidelity (e.g., fidelity in different portions being within threshold fidelity value of each other). For example, the strength and the type of enhancement applied may be adjusted so that fidelity over the higher-fidelity visual content matches the fidelity in the center portion of the higher-fidelity visual content. For instance, the non-uniform enhancement of the rectilinear visual content may be performed so that the fidelity in a corner/edge portion is the same/approximately same as the fidelity in the center portion.

In some implementations, different types of enhancement being applied at different portions may include different portions being enhanced differently. For example, different types of enhancement may be applied based on one or more features of things depicted within the portions and/or the different warping that was performed to generate the portions.

For example, the reduction in fidelity of the visual content may be more apparent for certain types of things depicted within the visual content and/or based on certain types of warping performed. For instance, warping in a direction that is not aligned with the direction of a thing may have reduce the fidelity more than warping in the same direction. For example, an edge that is warping orthogonally to the direction of the edge may result in greater fidelity loss than warping along the direction of the edge (e.g., a tree being warped in horizontal direction results in greater fidelity loss than the tree being warped in vertical direction). A direction in which a thing is depicted in the visual content may be determined, and the extent of alignment/misalignment of the warning to the direction of the thing's depictions may be used to determine the strength and/or the type of enhancement applied.

The non-uniform enhancement of the rectilinear visual content may increase fidelity uniformity of the higher-fidelity visual content. That is, the fidelity of the higher-fidelity visual content may be more uniform than the fidelity of the rectilinear visual content. For example, the corners of the rectilinear visual content may have less fidelity than the center of the rectilinear visual content. The non-uniform enhancement of the rectilinear visual content may increase fidelity uniformity of the higher-fidelity visual content such that the difference between the fidelity in the corners and center of the higher-fidelity visual content is less than the difference between the fidelity in the corners and center of the rectilinear visual content. For instance, the non-uniform enhancement of the rectilinear visual content may increase fidelity of the corners so that the fidelity of the corners are closer to/same as the fidelity at the center.

In some implementations, the non-uniform enhancement of the rectilinear visual content may include application of non-uniform super-resolution to the rectilinear visual content. Super-resolution may utilize machine learning techniques to increase the fidelity (e.g., resolution, depicted details) of different portions. In some implementations, the non-uniform enhancement of the rectilinear visual content may include application of non-uniform sharpening to the rectilinear visual content. Sharpening may result in sharper/clearer appearance of depictions within different portions. Other types of non-uniform enhancement of the rectilinear visual content are contemplated.

Figure 7A:
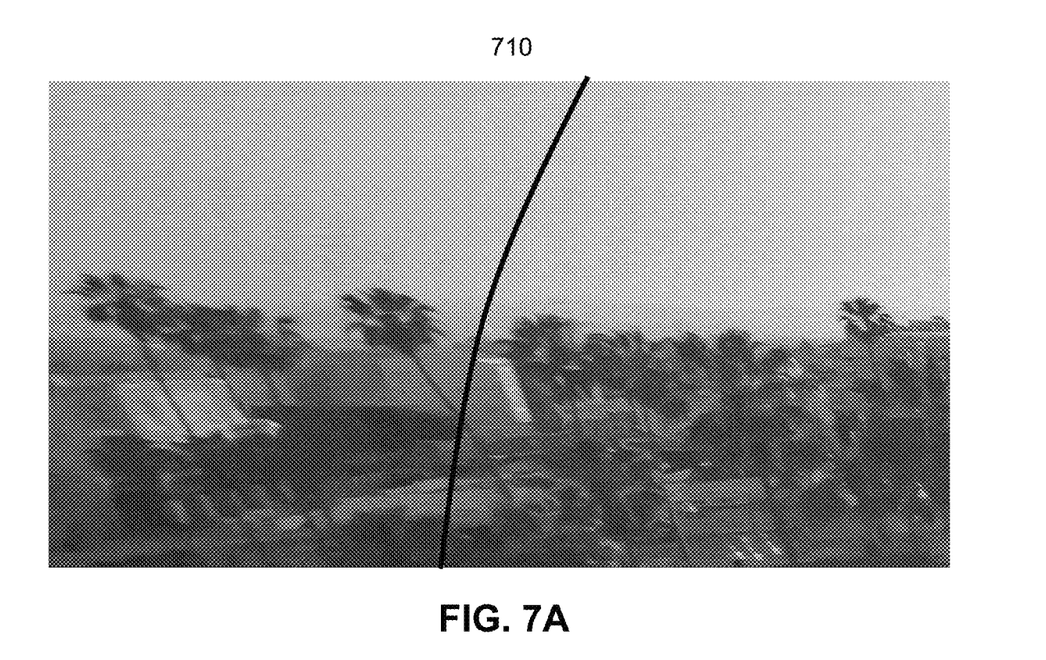
FIG. 7A illustrates an example portion of an image captured using a non-rectilinear lens.

FIG. 7A illustrates an example portion 710 of an image captured using a non-rectilinear lens. For example, the portion 710 may represent a portion of an image captured using fisheye lens. The portion 710 of the fisheye image may have been warped to reduce the amount of curvature in the portion 710. The warping of the portion 710 may have non-uniformly reduced the fidelity within the portion 710. For example, the fidelity on the left side of the portion 710 may be lower than the right side of the portion 710. The difference in fidelity may be due to greater warping having been performed on the left side of the portion 710 than the right side of the portion 10.

Figure 7B:
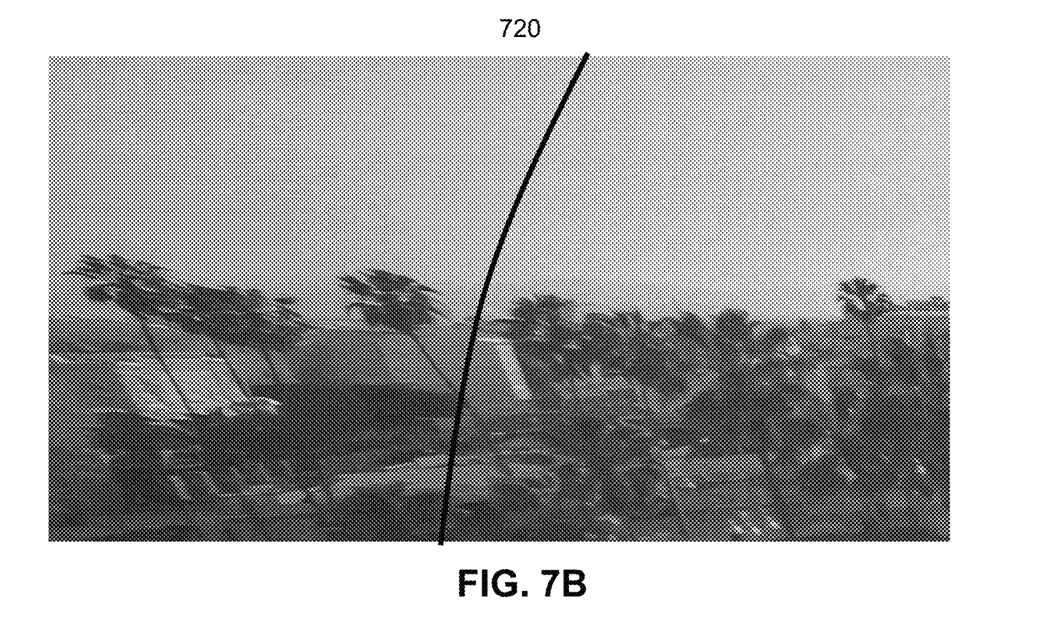
FIG. 7B illustrates an example enhancement of the image portion shown in FIG. 7A.

FIG. 7B illustrates an example enhancement of the image portion shown in FIG. 7A. The portion 710 of the image may be enhanced to generate an enhanced portion 720. Non-uniform enhancement may be applied to generate the enhanced portion 720. For example, greater enhancement may be applied to the left side of the portion 710 based on the left side of the portion 710 having lower fidelity, and less enhancement may be applied to the right side of the portion 710 based on the right side of the portion 710 having higher fidelity. The change in strength of enhancement applied may be gradual or immediate. For example, one strength of enhancement may be applied to the left side of the portion 710 while another (lower) strength of enhancement may be applied to the left side of the portion 710. As another example, a gradient of enhancement strength may be applied, with the strength increasing towards the left.

The non-uniform enhancement of the visual content may result in the enhanced portion 720 having higher fidelity than the portion 710. The non-uniform enhancement of the visual content may result in the enhanced portion 720 having more uniform fidelity than the portion 710. For example, the left side of the enhanced portion 720 may depict palm trees and buildings with higher fidelity (e.g., is sharper, with more details) than the left side of the portion 710. The difference in fidelity between the left and rights side of the enhanced portion 720 may be less than the difference in fidelity between the left and rights side of the portion 710.

In some implementations, the higher-fidelity visual content may be generated before and/or after encoding of the image by the image capture device. For example, the higher-fidelity visual content may be generated to replace the original visual content of the image when encoding the image. The higher-fidelity visual content may be generated to encode an additional image with higher fidelity (e.g., encode the original image and the higher-fidelity image).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
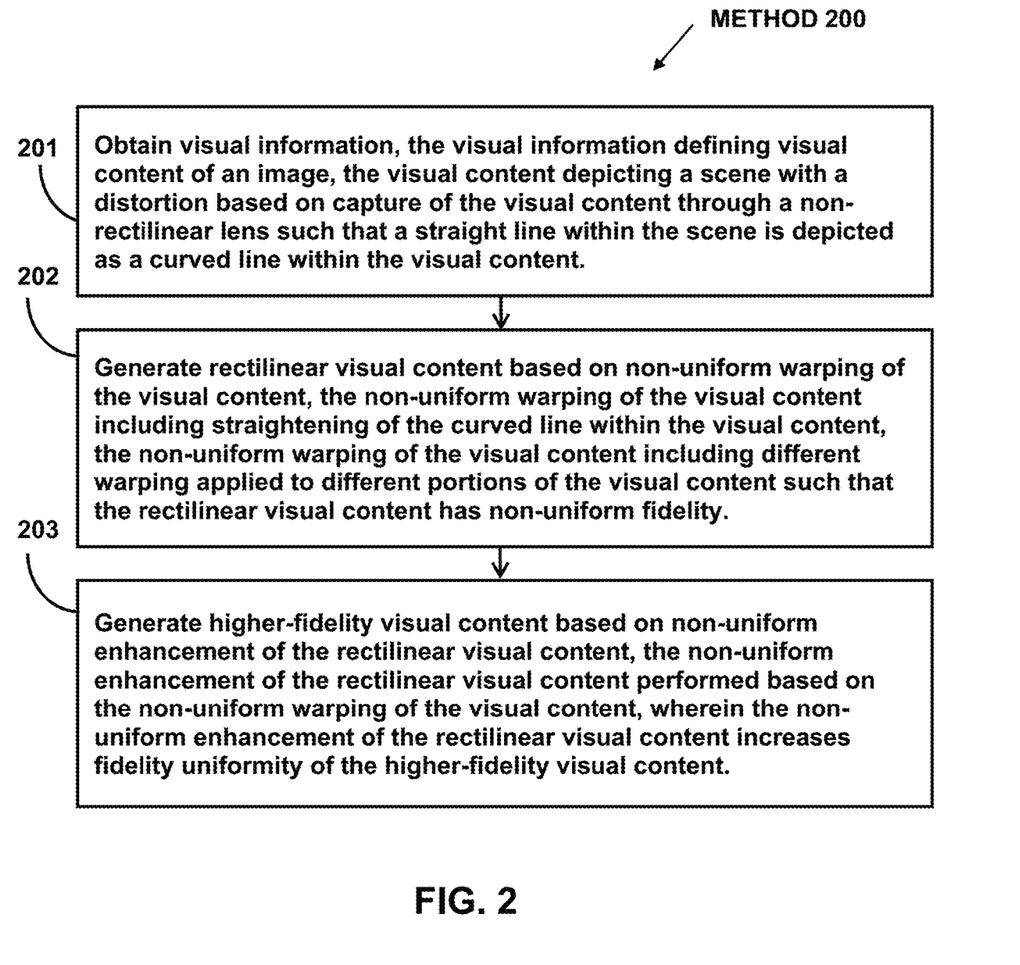
FIG. 2 illustrates an example method for increasing image fidelity.

FIG. 2 illustrates method 200 for increasing image fidelity. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information and/or other information may be obtained. The visual information may define visual content of an image. The visual content may depict a scene with a distortion based on capture of the visual content through a non-rectilinear lens such that a straight line within the scene is depicted as a curved line within the visual content. In some implementations, operation 201 may be performed by a processor component the same as or similar to the visual information component 102 (Shown in FIG. 1 and described herein).

At operation 202, rectilinear visual content may be generated based on non-uniform warping of the visual content. The non-uniform warping of the visual content may include straightening of the curved line within the visual content. The non-uniform warping of the visual content may include different warping applied to different portions of the visual content such that the rectilinear visual content has non-uniform fidelity. A first portion of the rectilinear visual content may have first fidelity and a second portion of the rectilinear visual content may have second fidelity lower than the first fidelity. In some implementations, operation 202 may be performed by a processor component the same as or similar to the non-uniform warming component 104 (Shown in FIG. 1 and described herein).

At operation 203, higher-fidelity visual content may be generated based on non-uniform enhancement of the rectilinear visual content. The non-uniform enhancement of the rectilinear visual content may be performed based on the non-uniform warping of the visual content and/or other information. The non-uniform enhancement of the rectilinear visual content may increase fidelity uniformity of the higher-fidelity visual content. The fidelity uniformity of the higher-fidelity visual content may be increased such that difference between the first fidelity of the first portion of the higher-fidelity visual content and the second fidelity of the second portion of the higher-fidelity visual content is reduced. In some implementations, operation 203 may be performed by a processor component the same as or similar to the non-uniform enhancement component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for increasing image fidelity, the system comprising:
   one or more physical processors configured by machine-readable instructions to:
     obtain visual information, the visual information defining visual content of an image, the visual content depicting a scene with a distortion based on capture of the visual content through a non-rectilinear lens such that a straight line within the scene is depicted as a curved line within the visual content;
     generate rectilinear visual content based on non-uniform warping of the visual content, the non-uniform warping of the visual content performed based on a type or characteristics of the non-rectilinear lens through which the visual content was captured, the non-uniform warping of the visual content including stretching or squeezing of different portions of the visual content to straighten the curved line within the visual content, stretching of the visual content resulting in greater loss of fidelity of the visual content than squeezing of the visual content, the non-uniform warping of the visual content including different warping applied to the different portions of the visual content such that the rectilinear visual content has non-uniform fidelity from non-uniform loss of fidelity in the visual content, wherein a first portion of the rectilinear visual content has first fidelity and a second portion of the rectilinear visual content has second fidelity lower than the first fidelity; and
     generate higher-fidelity visual content based on non-uniform enhancement of the rectilinear visual content, the non-uniform enhancement of the rectilinear visual content performed based on the non-uniform warping of the visual content that stretched or squeezed the different portions of the visual content based on the type or the characteristics of the non-rectilinear lens through which the visual content was captured, the non-uniform enhancement of the visual content restoring non-uniform fidelity reduction of the visual content from the non-uniform warping of the visual content, wherein the non-uniform enhancement of the rectilinear visual content increases fidelity uniformity of the higher-fidelity visual content such that difference between the first fidelity of the first portion of the higher-fidelity visual content and the second fidelity of the second portion of the higher-fidelity visual content is reduced.

2. The system of claim 1, wherein the distortion includes a barrel distortion and the non-rectilinear lens includes a fisheye lens.

3. The system of claim 2, wherein generation of the rectilinear visual content includes cropping of one or more outer portions of the visual content.

4. The system of claim 1, wherein the non-uniform enhancement of the rectilinear visual content includes application of non-uniform super-resolution to the rectilinear visual content.

5. The system of claim 1, wherein the non-uniform enhancement of the rectilinear visual content includes application of non-uniform sharpening to the rectilinear visual content.

6. The system of claim 1, wherein the non-uniform warping of the visual content including the different warping applied to the different portions of the visual content includes different strengths of warping being applied to the different portions of the visual content.

7. The system of claim 6, wherein the non-uniform enhancement of the rectilinear visual content being performed based on the non-uniform warping of the visual content includes different strengths of enhancement being applied to the different portions of the rectilinear visual content based on the different strengths of warping applied to the different portions of the visual content.

8. The system of claim 1, wherein:
a direction in which a thing is depicted in the visual content is determined; and
strength and/or type of enhancement applied in the non-uniform enhancement of the rectilinear visual content is determined based on extent of alignment or misalignment between a direction in which thing depicted in the visual content is warped and the direction in which the thing is depicted in the visual content.

9. The system of claim 1, wherein extent of fidelity lost due to the non-uniform warping of the visual content is determined and mapped onto a heatmap, and values of the heatmap are used as a multiplier for strengths of enhancement being applied to the different portions of the rectilinear visual content in the non-uniform enhancement of the rectilinear visual content.

10. A method for increasing image fidelity, the method performed by a computing system including one or more processors, the method comprising:
obtaining, by the computing system, visual information, the visual information defining visual content of an image, the visual content depicting a scene with a distortion based on capture of the visual content through a non-rectilinear lens such that a straight line within the scene is depicted as a curved line within the visual content;
generating, by the computing system, rectilinear visual content based on non-uniform warping of the visual content, the non-uniform warping of the visual content performed based on a type or characteristics of the non-rectilinear lens through which the visual content was captured, the non-uniform warping of the visual content including stretching or squeezing of different portions of the visual content to straighten the curved line within the visual content, stretching of the visual content resulting in greater loss of fidelity of the visual content than squeezing of the visual content, the non-uniform warping of the visual content including different warping applied to the different portions of the visual content such that the rectilinear visual content has non-uniform fidelity from non-uniform loss of fidelity in the visual content, wherein a first portion of the rectilinear visual content has first fidelity and a second portion of the rectilinear visual content has second fidelity lower than the first fidelity; and
generating, by the computing system, higher-fidelity visual content based on non-uniform enhancement of the rectilinear visual content, the non-uniform enhancement of the rectilinear visual content performed based on the non-uniform warping of the visual content that stretched or squeezed the different portions of the visual content based on the type or the characteristics of the non-rectilinear lens through which the visual content was captured, the non-uniform enhancement of the visual content restoring non-uniform fidelity reduction of the visual content from the non-uniform warping of the visual content, wherein the non-uniform enhancement of the rectilinear visual content increases fidelity uniformity of the higher-fidelity visual content such that difference between the first fidelity of the first portion of the higher-fidelity visual content and the second fidelity of the second portion of the higher-fidelity visual content is reduced.

11. The method of claim 10, wherein the distortion includes a barrel distortion and the non-rectilinear lens includes a fisheye lens.

12. The method of claim 11, wherein generating the rectilinear visual content includes cropping of one or more outer portions of the visual content.

13. The method of claim 10, wherein the non-uniform enhancement of the rectilinear visual content includes application of non-uniform super-resolution to the rectilinear visual content.

14. The method of claim 10, wherein the non-uniform enhancement of the rectilinear visual content includes application of non-uniform sharpening to the rectilinear visual content.

15. The method of claim 10, wherein the non-uniform warping of the visual content including the different warping applied to the different portions of the visual content includes different strengths of warping being applied to the different portions of the visual content.

16. The method of claim 15, wherein the non-uniform enhancement of the rectilinear visual content being performed based on the non-uniform warping of the visual content includes different strengths of enhancement being applied to the different portions of the rectilinear visual content based on the different strengths of warping applied to the different portions of the visual content.

17. The method of claim 10, wherein:
a direction in which a thing is depicted in the visual content is determined; and
strength and/or type of enhancement applied in the non-uniform enhancement of the rectilinear visual content is determined based on extent of alignment or misalignment between a direction in which thing depicted in the visual content is warped and the direction in which the thing is depicted in the visual content.

18. The method of claim 1, wherein extent of fidelity lost due to the non-uniform warping of the visual content is determined and mapped onto a heatmap, and values of the heatmap are used as a multiplier for strengths of enhancement being applied to the different portions of the rectilinear visual content in the non-uniform enhancement of the rectilinear visual content.

19. A system for increasing image fidelity, the system comprising:
one or more physical processors configured by machine-readable instructions to:

obtain visual information, the visual information defining visual content of an image, the visual content depicting a scene with a distortion based on capture of the visual content through a non-rectilinear lens such that a straight line within the scene is depicted as a curved line within the visual content;

generate rectilinear visual content based on non-uniform warping of the visual content, the non-uniform warping of the visual content performed based on a type or characteristics of the non-rectilinear lens through which the visual content was captured, the non-uniform warping of the visual content including stretching or squeezing of different portions of the visual content to straighten the curved line within the visual content, stretching of the visual content resulting in greater loss of fidelity of the visual content than squeezing of the visual content, the non-uniform warping of the visual content including different warping applied to the different portions of the visual content such that the rectilinear visual content has non-uniform fidelity from non-uniform loss of fidelity in the visual content, wherein a first portion of the rectilinear visual content has first fidelity and a second portion of the rectilinear visual content has second fidelity lower than the first fidelity; and generate higher-fidelity visual content based on non-uniform enhancement of the rectilinear visual content, the non-uniform enhancement of the rectilinear visual content performed based on the non-uniform warping of the visual content that stretched or squeezed the different portions of the visual content based on the type or the characteristics of the non-rectilinear lens through which the visual content was captured, the non-uniform enhancement of the visual content restoring non-uniform fidelity reduction of the visual content from the non-uniform warping of the visual content, the non-uniform enhancement of the rectilinear visual content including application of non-uniform super-resolution to the rectilinear visual content, wherein the non-uniform enhancement of the rectilinear visual content increases fidelity uniformity of the higher-fidelity visual content such that difference between the first fidelity of the first portion of the higher-fidelity visual content and the second fidelity of the second portion of the higher-fidelity visual content is reduced.

20. The system of claim 19, wherein:

a direction in which a thing is depicted in the visual content is determined, and strength and/or type of enhancement applied in the non-uniform enhancement of the rectilinear visual content is determined based on extent of alignment or misalignment between a direction in which thing depicted in the visual content is warped and the direction in which the thing is depicted in the visual content; or extent of fidelity lost due to the non-uniform warping of the visual content is determined and mapped onto a heatmap, and values of the heatmap are used as a multiplier for strengths of enhancement being applied to the different portions of the rectilinear visual content in the non-uniform enhancement of the rectilinear visual content.

* * * * *